United States Patent [19]

Nakagawa

[11] 4,239,474
[45] Dec. 16, 1980

[54] APPARATUS FOR MOLDING A PLASTIC PIPE

[75] Inventor: Tatsuya Nakagawa, Matsudo, Japan

[73] Assignee: Excell Corporation, Tokyo, Japan

[21] Appl. No.: 53,210

[22] Filed: Jun. 29, 1979

[51] Int. Cl.$^3$ .......................................... B29C 17/07
[52] U.S. Cl. ................................. 425/525; 264/540;
 264/541; 264/542; 264/543; 425/150; 425/166;
 425/532; 425/540; 425/326.1
[58] Field of Search .................... 425/150, 325, 326.1,
 425/532, 540, 525, 162, 166; 264/506, 531,
 540–543

[56] References Cited

U.S. PATENT DOCUMENTS

| | | | |
|---|---|---|---|
| 1,634,160 | 6/1927 | Semple | 425/325 X |
| 2,128,239 | 8/1938 | Ferngren | 264/540 |
| 3,425,092 | 2/1969 | Taga | 264/543 X |
| 3,733,309 | 5/1973 | Wyeth et al. | 425/532 X |

Primary Examiner—Jan H. Silbaugh
Attorney, Agent, or Firm—Fidelman, Wolffe & Waldron

[57] ABSTRACT

A lower mold half is horizontally placed. The top surface of the lower mold half is provided with a first groove of any desired shape, one end of which is closed with the other end having a notch for allowing air to be blown in. An upper mold half has a bottom surface which matches with the top surface of the lower mold half and which is provided with a second groove corresponding to said first groove. Thus, when the upper and lower mold halves are in contact, there is formed a mold cavity defined by the first and second grooves. A nozzle for discharging a parison is disposed above the lower mold half. The relative positional relation between the nozzle and the lower mold half is changed in such a manner that the nozzle follows the first groove without changing the distance therefrom so that a parison can be properly placed in the first groove. If at least two lower mold halves are provided, it is possible to carry out molding operation continuously.

9 Claims, 13 Drawing Figures

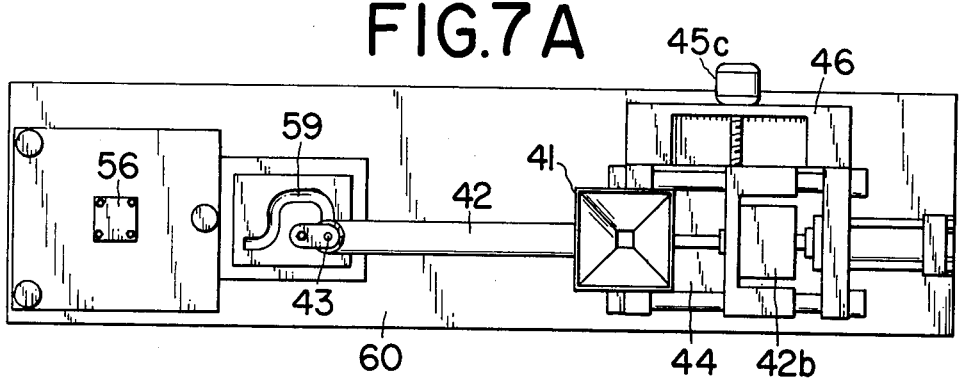
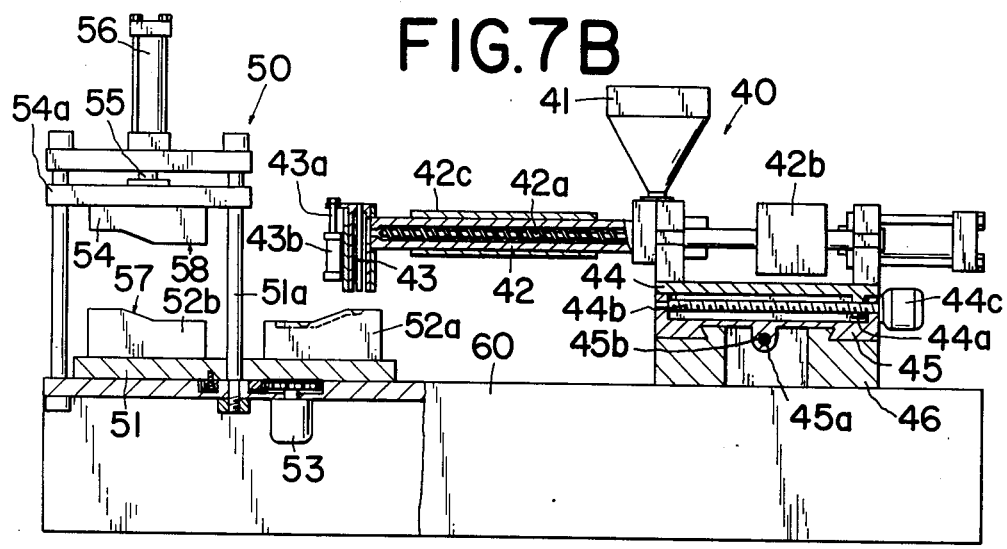
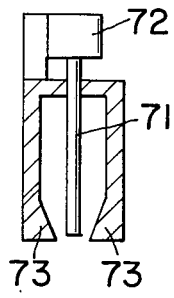
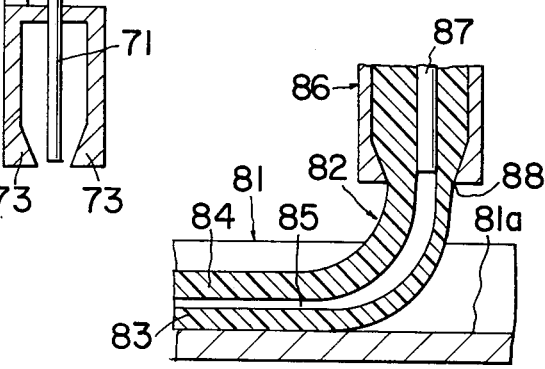
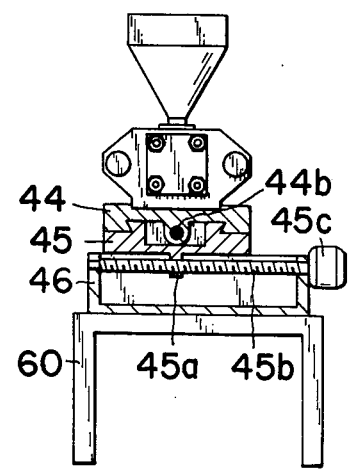

APPARATUS FOR MOLDING A PLASTIC PIPE

SUMMARY OF THE INVENTION

The present invention relates to an apparatus for molding a plastic pipe, which is particularly suitable for forming a plastic pipe of complicated configuration.

Since a pipe used as an air duct for a ventilation device or cooling device must generally be disposed at a position subject to different constraints, a rubber pipe rich in deformability, or flexibility, has been conventionally used. If the material of a pipe has poor flexibility, various kinds of pipe joints must be prepared to complete a piping system.

Although a rubber pipe can be used with excellent performance and easy handling, its exorbitant production cost and difficulty in forming a pipe in complicated configuration inhibit wide spread application. Under the circumstances, attention has recently shifted to use a less expensive thermal plastic resin such as polyethylene, polypropylene and the like as an alternative material. When use is made of a thermal plastic resin, however, there are still disadvantages mainly caused by the difficulty in forming a plastic pipe of complicated configuration in accordance with the conventional technology. For example, a number of plastic pipes of different sizes and shapes together with various kinds of joints such as elbows must be prepared. It is quite time consuming to assemble these pipes and joints to set up a desired piping system. Furthermore, it is often the case to leave small interstices at a joint, which allow the passage of fluid.

Explaining the conventional technique to form an elbow pipe with reference to FIGS. 1 to 3, a parison 13 in the form of a hollow tube is continuously extruded out of a nozzle 14 vertically downward, i.e. in the direction of gravity, into the position where vertical mold halves 12a and 12b, each having an engraved groove 11a or 11b on its surface, are oppositely placed. Each of the grooves 11a or 11b has a semi-circular cross section so that when the mold halves 12a and 12b are brought into contact, a mold cavity in the form of an elbow pipe is defined therebetween. Then the mold halves 12a and 12b are brought into contact under pressure, followed by blowing air into the parison. Upon cooling, an elbow pipe is formed in compliance with the shape of the grooves engraved in the mold halves.

In accordance with this conventional technique, however, since the parison 13 is hanging down from the nozzle 14 under gravity between the vertically arranged mold halves, there is a limit in length and it is virtually impossible to control its thickness. If the parison 13 gets too long, it will change its shape or simply tear off. Moreover, if a pipe to be formed is complicated in structure, it will necessarily produce a flash by overflowing the mold cavity because excessive material must be supplied. This requires a secondary processing of flash removal which, in turn, increases production cost. For example, even in the case of molding an elbow pipe as explained above, somewhat excessive material must be supplied to fill the cavity completely. When the mold halves 12a and 12b are pressed against each other, the excessive material overflows into the gap between the mold halves 12a and 12b to produce a flash 16. The production of such a flash is just waste of material as well as requiring a secondary processing of flash removal, which can be quite laborious if the pipe is complicated in configuration. Therefore, in accordance with such a conventional plastic pipe molding technique, it is impossible to form a pipe of complicated configuration, e.g. a pipe provided with bellows in the middle to give flexibility in bending, a pipe with a sudden area change, or a pipe with its shape changing three dimensionally.

An object of the present invention is to provide an apparatus for molding a plastic pipe which is capable of molding a pipe of complicated configuration without producing a flash.

Another object of the present invention is to provide an apparatus for molding a plastic pipe which is capable of forming a long pipe with any desired thickness.

A further object of the present invention is to provide an apparatus for molding a plastic pipe which comprises a lower mold half, an upper mold half which can be placed on the lower mold half to define a mold cavity, and a parison extruder, whereby the relative positional relationship between the lower mold half and the parison extruder is varied under control to lay a parison properly in the groove engraved on the surface of the lower mold half.

A still further object of the present invention is to provide an apparatus for molding a plastic pipe which comprises two or more lower mold halves mounted on a rotatable support so that pipe molding can be continuously operated.

For a better understanding of the invention as well as further objects and features thereof, reference is had to the following detailed description of the invention to be read in connection with the accompanying drawings.

BRIEF DESCRIPTION OF THE DRAWINGS

FIGS. 7A, 7B and 7C are a plan view, a front elevational view and a side elevational view, respectively, showing another embodiment of the present invention, FIG. 8 is a schematic illustration showing an example of a parison control device, and FIG. 9 is a schematic illustration showing an example of the means of discharging a parison in a manner such that the thickness of the parison is unequal.

DETAILED DESCRIPTION OF THE INVENTION

Figure 1:
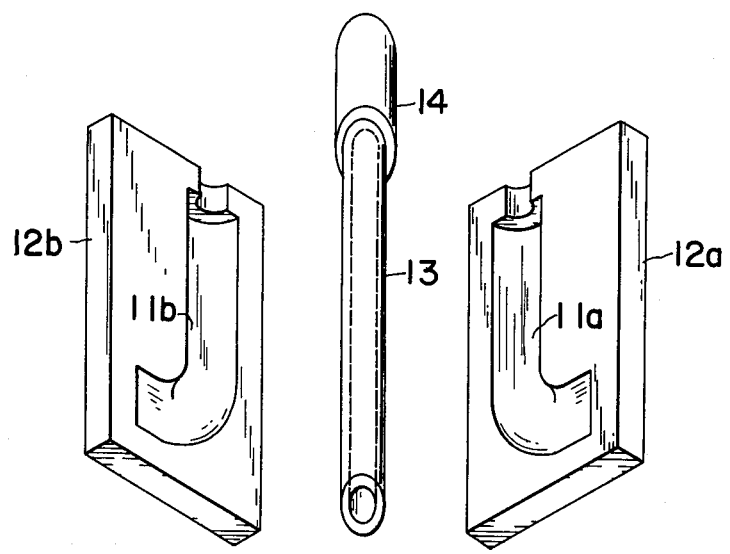
FIG. 1 is a perspective view showing a conventional device.
Figures 2, 3:
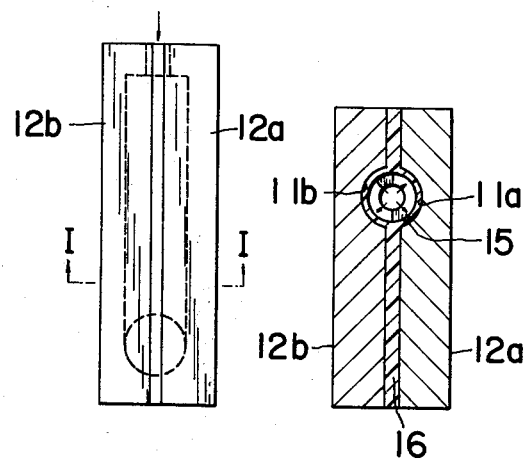
FIG. 2 is a side elevational view of the device shown in FIG. 1, but with the two mold halves in contact.
FIG. 3 is a sectional view taken along the line I—I of FIG. 2.
Figure 4:
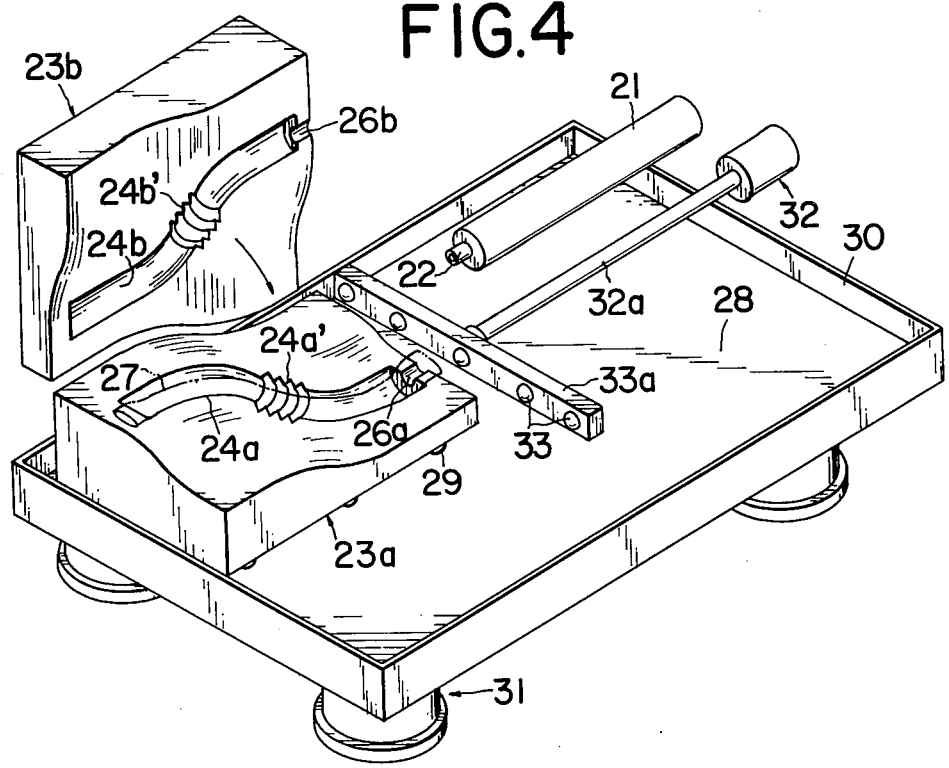
FIG. 4 is a perspective view showing one embodiment of the present invention.
Figure 5A:
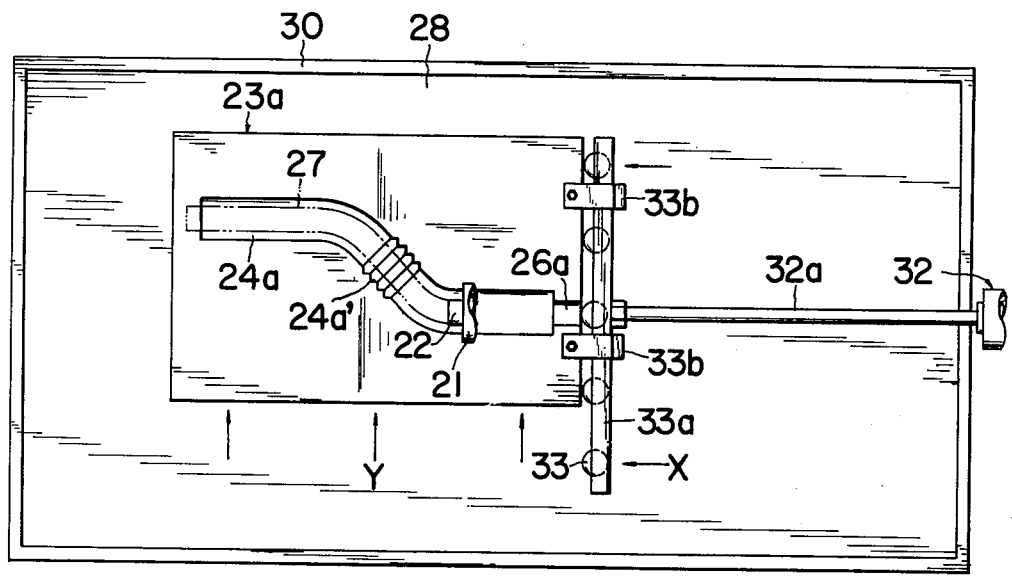
FIGS. 5A and 5B are a plan view and a sectional view cut along the groove, respectively.
Figure 5B:
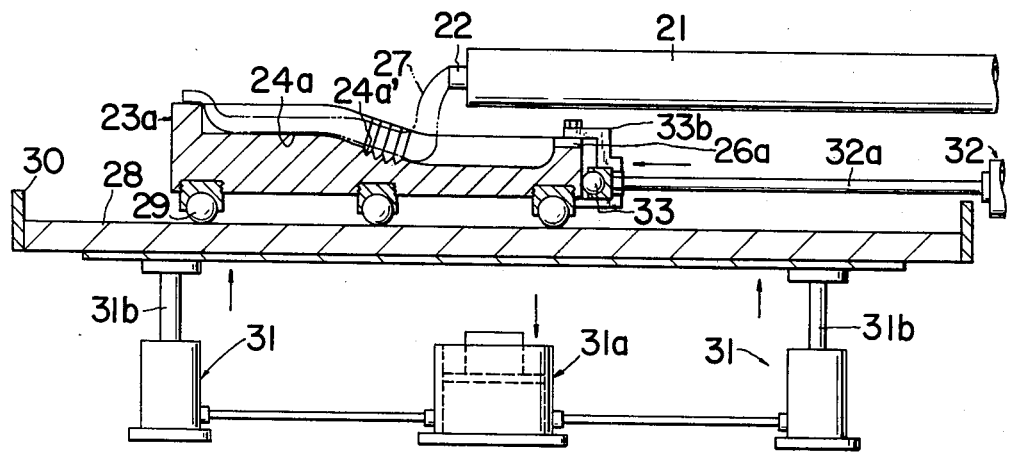

In FIGS. 4 and 5, a numeral 21 designates a tube containing a material for forming a parison 27, which is usually a thermal plastic material such as polyethylene, polypropylene, etc. A numeral 22 designates a nozzle for discharging a parison 27 in the form of a tube. The tube 21 and the nozzle 22 are parts of a parison extruder. In this embodiment, the tube 21 and the nozzle 22 are fixedly provided and a mold 23 is moved with respect thereto. The mold 23 comprises a lower mold half 23a and an upper mold half 23b, each of which is provided with a groove 24a or 24b of semi-circular cross section engraved on its joining surface. As shown in the drawings, the joining surfaces of the mold 23 have a three dimentional variation in accordance with the curve required for forming a plastic pipe of desired shape. The forward end of the groove 24a or 24b is closed so that the mold cavity defined by the grooves can be sealed when the lower and upper mold halves 23a and 23b are put together; whereas, the rearward end of the groove 24a or 24b is provided with a notch 26a or 26b for blowing air into the parison. Numerals 24a' and 24b' indicate sections of the grooves 24a and 24b, respectively, where bellows are formed.

A numeral 28 designates a horizontal support on which the lower mold half 23a is placed in such a manner that it can move freely. The lower mold half 23a is provided with a plurality of bearings 29, composed of steel balls or the like, which are rotatably held on the bottom surface thereof. A numeral 30 designates a frame fixed to the outer periphery of the support 28 for limiting the unexpected horizontal overrun of the lower mold half 23a. The mold 23 is operatively associated with a horizontal driving means and a vertical driving means.

One example of the horizontal and vertical driving means will be explained with reference to FIGS. 4 and 5. The support 28 is placed on a plurality of rods 31b which are individually housed in cylinders 31. The cylinders 31 are hydrodynamically connected to a pressure regulator 31a, which, in turn, is connected to a pressure source (not shown). While, another cylinder 32 and a rod 32a are disposed horizontally and a horizontal bar 33a with balls 33 partially embedded therein is attached at the forward end of the rod 32a. The horizontal bar 33a is slidably supported by a pair of brackets 33b. As best shown in FIG. 5A, only one cylinder actuator for moving the mold 23 in the X-direction is shown in the drawings; however, it is to be noted that there should be provided another cylinder actuator which moves the mold 23 in the Y-direction, but this is omitted in the drawings for simplicity.

The cylinder actuators for moving the mold in the X and Y directions are hydrodynamically connected to respective pressure regulators (not shown), which, in turn, are connected to a pressure source (not shown). All of these three pressure regulators are operatively connected to a control device (not shown) such as a numeral control device so that the mold 23 can be moved automatically with the center line of the groove 24a always positioned immediately below and at the same distance from the nozzle 22.

The process of molding a plastic pipe with the use of the present apparatus will now be explained. First, as shown in FIGS. 4 and 5, the groove 24a of the lower mold half 23a is positioned below the nozzle 22. Then, with the parison 27 continuously discharged out of the nozzle 22, the lower mold half 23a is moved horizontally as well as vertically in accordance with instructions from the control device so that the parison 27 can be laid properly within the groove 24a. On the other hand, the horizontal and vertical movement of the lower mold half 23a may be operated manually, or any other mechanical or electrical means.

With the parison 27 properly positioned in the groove 24a, the upper mold half 23b is placed on the lower mold half 23a, and then air at a predetermined pressure is injected through a port 26 defined by the notches 26a and 26b into the parison 27. Since the forward end of the parison 27 is sealed like a bag when the upper and lower mold halves are put together, the parison 27 becomes inflated within the mold cavity and formed into a certain shape defined by the surfaces of the grooves. Upon cooling, the upper mold half 23b is removed to take out a molded pipe. In the case where the above-mentioned operation is to be continuously executed, two or more supports 28, each having a lower mold half 23a thereon, may be disposed on a rotatable disc.

Figures 6A, 6B:
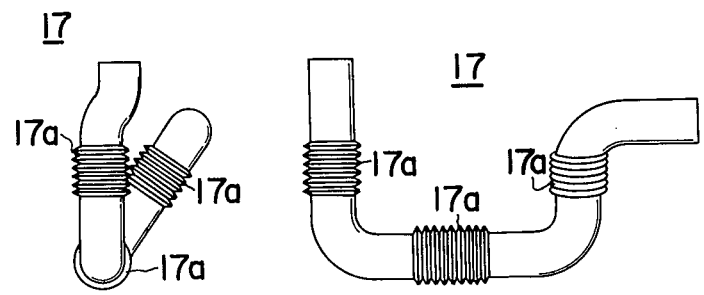
FIGS. 6A and 6B are a side elevational view and a front elevational view, respectively, of the plastic pipe formed according to the present invention.

FIGS. 6A and 6B show one example of the plastic pipe molded by the apparatus in accordance with the present invention. A thin pipe 17 has rising parts at the front and rear ends. As shown in FIG. 6A, the pipe is twisted to present a V-shape, and as shown in FIG. 6B, the right-hand rising part is bent outward at 90 degrees. Bellows 17a, 17b and 17c are provided to give flexibility in bending.

Another embodiment of the present invention is shown in FIGS. 7A, 7B and 7C. As different from the above-described embodiment, a nozzle from which a parison is discharged is moved while temporarily keeping a lower mold half stationary. The present apparatus comprises a base 60 on which a parison supply section 40 and a mold processing section 50 are provided.

The parison supply section 40 includes a hopper 41 in which a source material for parison is contained. A tube 42 extends horizontally from the bottom of the hopper 41 and an auger screw 42a is housed therein. A heater 42c is wrapped around the tube 42. The auger screw 42a is driven to rotate by a motor 42b to send the source material along the tube 42 to a nozzle 43 which is mounted at the end of the tube 42. The nozzle 43 is fixed to a rod 43a housed in a cylinder 43b which is fixedly mounted on the tube 42. Therefore, the nozzle 43 can be moved vertically with respect to the tube 42.

The tube 42 is fixedly mounted on a top plate 44 which is movable in the longitudinal direction of the tube 42. A projection 44a extends downward from the top plate 44 and is in mesh with a threaded rod 44b which is driven to rotate by a motor 44c and rotatably supported by an intermediate plate 45. Thus, the rotation of the rod 44b causes to move the top plate 44 slidingly with respect to the intermediate plate 45 in the longitudinal direction of the tube 42.

While, the intermediate plate 45 also has a downwardly extending projection 45a which is in mesh with a threaded rod 45b drivingly connected to a motor 45c. The rod 45b is rotatably supported by a frame 46 which is fixedly provided on the base 60. Therefore, the rotation of the rod 45b causes the intermediate plate 45 to move in the direction perpendicular to the longitudinal direction of the tube 42. As a result, the top plate 44, and therefore the nozzle 43 can be moved in any desired horizontal direction by driving the motors 44c and 45c appropriately. Furthermore, since the nozzle 43 can be moved vertically by means of the rod 43a and cylinder 43b combination, the nozzle 43 can be moved in any desired direction in three-dimension.

The mold processing section 50 includes a rotatable support 51 on which two lower mold halves 52a and 52b are fixedly provided. By means of a motor 53, the support 51 can be rotated around a shaft 51a. An upper mold half 54 is fixedly provided on an upper plate 54a which is attached at the end of a vertical rod 55. The vertical rod 55 is housed in a cylinder 56 and, in accordance with the pressure supplied to the cylinder 56, the rod 55 moves in and out of the cylinder 56 to determine the position of the upper mold half 54.

The top surface 57 of the lower mold half 52a or 52b has an arbitrary curve depending on the shape of a pipe to be molded. The upper mold half 54 has a bottom surface 58 which matches with the top surface 57 of the bottom mold half 52a or 52b. On the curved surface 57 or 58 is engraved a groove 59 so that, when the upper and lower mold halves are brought into contact, there is formed a mold cavity defining the shape of a pipe to be molded.

The motors 44c and 45c and the cylinder 43b are all operatively connected to a control unit (not shown) such as a numerical control device, in which the shape of a pipe to be molded can be programmed beforehand. Therefore, the motors 44c and 45c are driven and the cylinder 43b is actuated in accordance with the instructions fed from the control unit so that the nozzle 43 moves to follow the groove 59 with maintaining a predetermined distance therefrom to lay a parison properly within the groove 59.

Meanwhile, the motor 53 and the cylinder 56 are also operatively connected to the control unit. Thus, when a parison is laid within the groove 59, the motor 53 is driven to rotate the support 51 by 180 degrees in accordance with the instruction from the central control unit. Then, the upper mold half 54 is brought downward into contact with the lower mold half 52b, in the groove of which is positioned a parison, to initiate a blow molding process. At the same time, the nozzle 43 starts to supply a parison onto the other lower mold half 52a. In this manner, the pipe molding operation can be carried out continuously.

In order to control the thickness of a parison, a parison control device can be provided at the exit of a parison discharging nozzle. One example of the parison control is shown in FIG. 8, where an inner rod 71 is connected to a cylinder actuator 72 which is fixedly provided on the parison discharging nozzle 43. A tapered portion 73 is provided at the exit of the nozzle 43. Thus, by changing the position of the inner rod 71 with respect to the nozzle 43, the thickness of a parison can be easily controlled. This is particularly important if a pipe to be molded is complicated in configuration. Because, the thickness of the parison must be increased at a portion where the diameter is relatively large or there are many ups and downs if the uniform thickness in a molded pipe is desired.

The desirable thickness of a tube-formed parison laid within a groove of a lower mold half is as shown in FIG. 9, i.e. a tube-formed parison 82 is thinner at a part 83 in contact with a groove 81a of a lower mold half 81 than at a part 84 exposed to air. As for the method of making the lower part 83 thinner than the upper part 84, as shown in FIG. 9, an inner rod 87 necessary for providing a hollow part 85 of the parison 82 is disposed at a position closer to one side of an opening 88 of a nozzle 86. Such position of the inner rod 87 causes the difference in the width of the parison flowing passage at the opening 88 and thereby the parison of a predetermined unequal thickness is discharged out of the nozzle 86.

The reason of making the thickness of the parison unequal is as follows. The parison at the part 83 in contact with the lower mold half is cooled by the contact and thereby it slightly hardens. Therefore, when air is blown into the hollow part 85 of the parison 82 in order to inflate the parison 82, the slightly hardened part can not extend enough as compared with the upper hot soft part. As the result, if the thickness of the discharged parison is equal throughout the whole part, the lower part of the parison cannot extend enough and becomes thicker than the upper part. That means the thickness of the finished pipe is made unequal. The abovementioned problem can be dissolved by discharging the parison in a manner the lower part 83 of the parison is thinner than the upper part 84. Because, as abovementioned, the lower part of the parison cannot extend enough as compared with the upper part, at the time of inflating the parison, the lower part cannot be made thin so much as the upper part. As the result, the thickness of the finished pipe can be made equal throughout the whole part.

As described above, in accordance with the present invention, a pipe of any required shape can be easily molded at low cost with the use of inexpensive thermal plastic materials. Moreover, since no flash is produced in accordance with the present invention, it is particularly suitable for mass production. The horizontal arrangement of mold halves enables production of a relatively long pipe.

It will be understood that the various changes in details, materials, steps and arrangements of parts, which have been herein described and illustrated in order to explain the nature of the invention, may be made by those skilled in the art within the principle and scope of the invention as expressed in the appended claims. However, while the invention has been described with reference to the structure disclosed herein, it is not to be confined to the details set forth, and this application is intended to cover such modifications or changes as may come within the scope of the following claims.

I claim:

1. An apparatus for molding a plastic pipe comprising a lower mold half having a top surface provided with a first groove of a desired shape, an upper mold half having a bottom surface provided with a second groove of a shape corresponding to the shape of the first groove, said first and second grooves defining a mold cavity when said top and bottom surfaces are in contact, a parison extruder including a nozzle for discharging a parison into and along the first groove of said lower mold half, means for changing horizontally the relative position between said lower mold half and said parison extruder, means for changing vertically the relative position between said lower mold half and said parison extruder to maintain a predetermined distance therebetween, and means for injecting pressurized gas into the parison in the mold cavity for shaping as defined by the mold cavity, wherein the means for changing said relative horizontal and vertical positions are operable during discharging of the parison.

2. An apparatus according to claim 1, wherein said parison extruder is stationary and said lower mold half is movable horizontally and vertically with respect to said stationary parison extruder.

3. An apparatus according to claim 2, further comprising control means for controlling the movement of said lower mold half so that the center line of said first groove is always positioned immediately below the nozzle of said parison extruder.

4. An apparatus according to claim 1, wherein said parison extruder is capable of discharging a parison such that the thickness of the parison at the part to be in contact with the first groove of the lower mold half is thinner than that of the remaining part of the parison.

5. An apparatus for molding a plastic pipe comprising at least two lower mold halves each of which is provided with a first groove of a desired shape on its top surface, a rotatable support on which said lower mold halves are fixedly mounted, at least one upper mold half which is provided with a second groove on its bottom surface corresponding to the shape of the grooves of the lower mold halves, said first and second grooves defining a mold cavity when said top and bottom surfaces are in contact, means for moving said upper mold half to a raised position away from said lower mold halves and a lowered position in contact with said lower mold halves, discharging means for discharging a parison onto one of said lower mold halves while said rotatable support is stationary, horizontal moving means for moving said discharging means horizontally along the groove of one of said lower mold halves, vertical moving means for moving said discharging means vertically to maintain a predetermined distance between said discharging means and the groove so that a parison may be properly laid in said groove, means for intermittently rotating said support to position said lower mold halves alternately adjacent said discharging means and means injecting pressurized gas into the parison in the mold cavity for shaping as defined by the mold cavity, wherein the vertical and horizontal moving means are operable during discharging of the parison.

6. An apparatus according to claim 5, wherein said discharging means comprises a hopper in which thermal plastic resin is contained, a tube, one end of which is mounted at the bottom of said hopper while the other end is provided with a nozzle, and an auger screw rotatably housed in said tube.

7. An apparatus according to claim 6, wherein said tube is wrapped around with a heater tape.

8. An apparatus according to claim 6, wherein said discharging means further comprises a tapered portion at the exit of said nozzle and an inner rod extending in said nozzle movably in its longitudinal direction.

9. An apparatus according to claim 5, wherein said horizontal moving means includes a pair of threaded rods disposed at right angles for controlling the horizontal movement of said discharging means.

* * * * *